Aug. 14, 1923.
M. STRINGER
1,465,066
BRAKING SYSTEM FOR AUTOMOTIVE VEHICLES
Filed Aug. 13, 1920   3 Sheets-Sheet 2
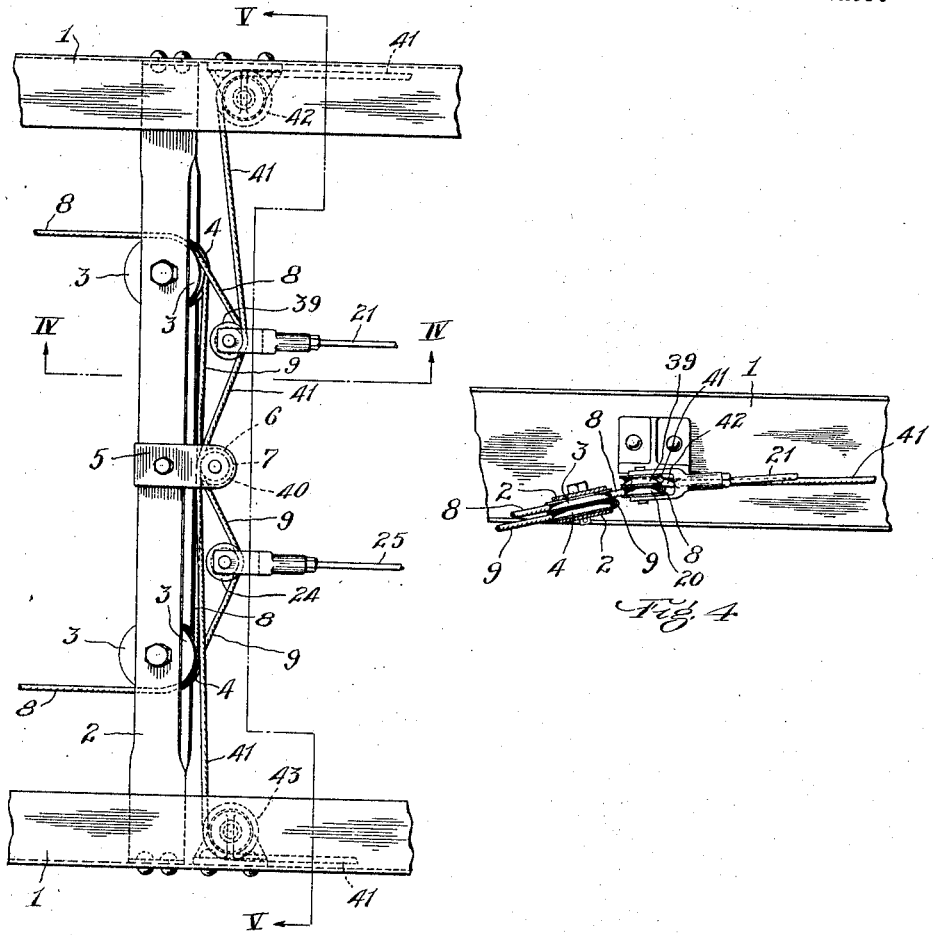
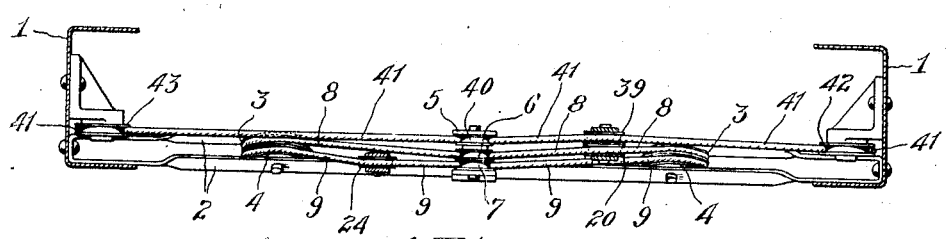
Inventor
MELVIN STRINGER Aug. 14, 1923.

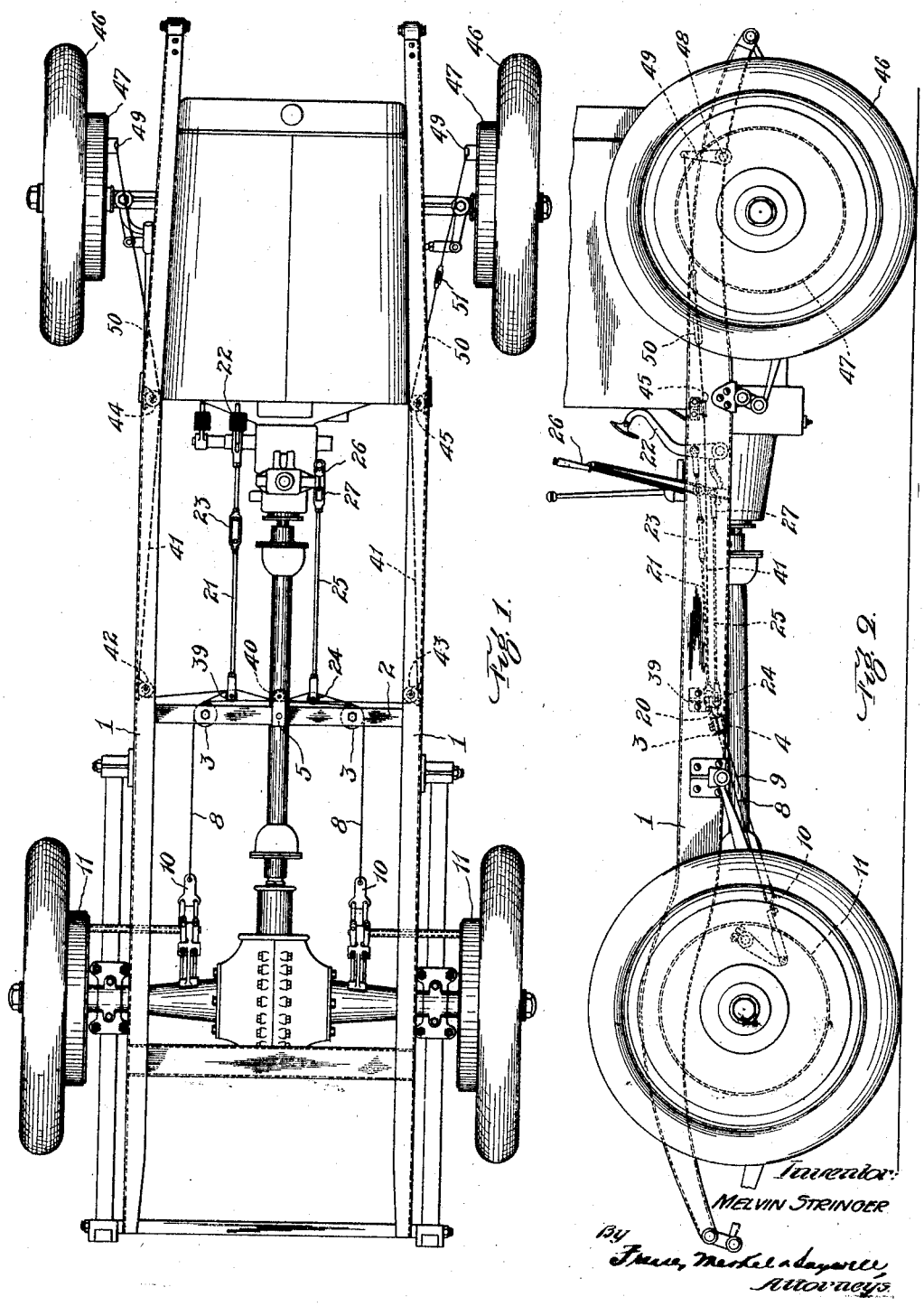

M. STRINGER 1,465,066

BRAKING SYSTEM FOR AUTOMOTIVE VEHICLES

Filed Aug. 13, 1920   3 Sheets-Sheet 3

Inventor:
MELVIN STRINGER
By
Freeno, Markel, Layerce,
Attorneys.

Patented Aug. 14, 1923.

1,465,066

UNITED STATES PATENT OFFICE.

MELVIN STRINGER, OF CLEVELAND, OHIO, ASSIGNOR OF ONE-FOURTH TO GEORGE T. BANDER AND ONE-FOURTH TO ARTHUR E. MERKEL, BOTH OF CLEVELAND, OHIO.

BRAKING SYSTEM FOR AUTOMOTIVE VEHICLES.

Application filed August 13, 1920. Serial No. 403,207.

*To all whom it may concern:*

Be it known that I, MELVIN STRINGER, a citizen of the United States, resident of Cleveland, county of Cuyahoga, and State of Ohio, have invented new and useful Improvements in Braking Systems for Automotive Vehicles, of which the following is a specification, the principle of the invention being herein explained and the best mode in which I have contemplated applying that principle, so as to distinguish it from other inventions.

My invention relates to braking systems for automotive vehicles, and particularly to that class of systems employing as an element thereof a flexible cable. The object of the invention is to provide a system of the above described character which will be efficient in its operation and economical in construction.

The said invention consists of means hereinafter fully described and particularly set forth in the claims.

More specifically the invention consists of a construction in which a flexible cable or cables connect the rear wheel brakes with either or both the foot and emergency lever, in combination with a flexible cable connected with the brakes acting upon the dirigible front wheels, said latter cable being operated either by the foot lever or the emergency lever, preferably, however, by the foot lever only.

The annexed drawings and the following description set forth in detail certain means embodying my invention, the disclosed means, however, constituting but one of the various mechanical forms in which the principle of the invention may be applied.

In said annexed drawings:

Figure 1 represents a plan of the chassis of an automobile embodying my invention.

Figure 2 represents a side elevation thereof.

Figure 3 represents, upon an enlarged scale, a fragmentary plan.

Figure 4 represents a fragmentary section taken upon the plane indicated by line IV—IV, Figure 3, viewed in the direction indicated by the arows.

Figure 5 represents a section taken upon the plane indicated by lines V—V, in Figure 3, and viewed in the direction indicated by the arrows.

Figure 6:
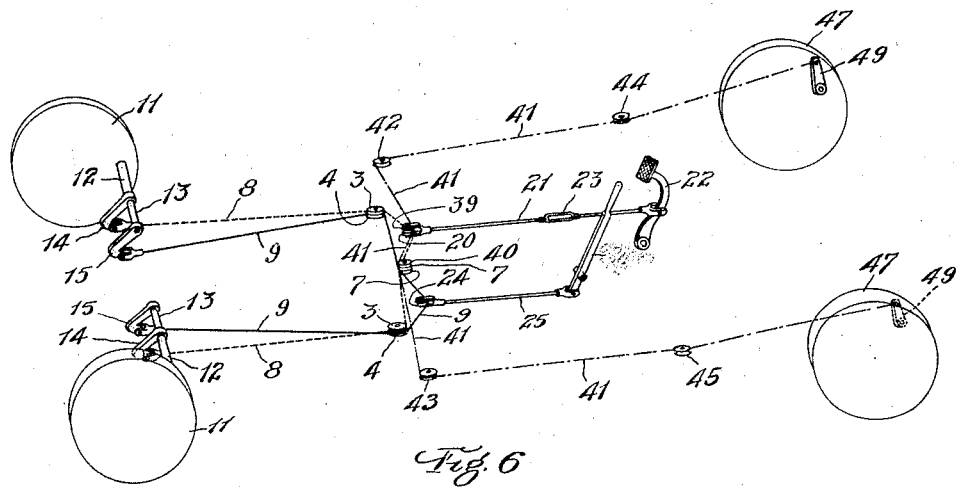
Figure 6 represents a diagrammatic perspective view of parts illustrating a modified form of my invention, and Figure 7 likewise represents a similar diagrammatic view of a second modification.

The embodiment of my invention, as illustrated in Figures 1 to 5 inclusive, includes a rear wheel brake construction embodying the construction shown, described and claimed in my Patent No. 1,348,331, Aug. 3, 1920, the present construction, however, being an amplification thereof to accommodate additional braking mechanism applicable to the front or dirigible wheels, all as will be hereinafter fully described.

As in the construction of said patent, I employ, as shown in Figures 1 to 5 inclusive, a cross member 2 mounted upon the frame 1 and upon this cross member are mounted two pairs of pulleys 3 and 4, also the guiding pulleys 6 and 7, Figure 5, around which pass the two cables 8 and 9. The rear ends of these cables are secured to the plates 10, which are connected with the levers which oscillate the rods carrying the cams which expand the brakes in the brake drums 11. The foot lever 22 is connected, by means of a rod 21, with one of the cables by means of a pulley 20, turnbuckle 23 being provided for adjustment, all as fully described in the above mentioned patent. The emergency lever 26 is connected by means of the rod 25 to the other cable through the medium of the pulley 24, a turnbuckle 27 being provided for adjustment, also as described in said pending application.

The operation of the foot lever 22, therefore, will actuate all four brake bands and the operation of the emergency lever 26 will likewise operate same.

In addition to the above, however, I have, in the present invention, supplied to the end of the rod 21 an additional pulley 39, and added to the two guiding pulleys 6 and 7 a third pulley 40. A third cable 41 passes around the pulley 40 and over the front of pulley 39 laterally toward both sides of the frame, where it passes over pulleys 42 and 43 mounted upon the frame of the vehicle in any suitable manner. Also mounted upon the frame and forwardly of the pulleys 42 and 43 are two pulleys 44 and 45 on opposite sides, over the periphery of which and toward the inside, this third cable also passes, as shown in Figure 1.

The front dirigible wheels 46 are each provided with ordinary brakes, including brake drums 47, a single pair of interior brake bands therefor, one for each drum, cam rods 48, and the crank arms 49. The forward ends of the cable 41 are secured to the free ends of these crank arms, as shown in Figure 2, said cables passing through slots 50 cut in the webs of the side frame members, as shown in dotted lines in Figure 2. A turnbuckle 51, Figures 1 and 2, is preferably introduced as a part of the cable for adjustment, and I prefer, in assembling the parts to make the adjustment such that when the foot lever is operated the front brakes will take hold slightly in advance of the rear brakes. This is desirable, especially when the vehicle is travelling at a high speed, inasmuch as the tendency of the rear wheels to skid is counteracted by causing the braking action to take effect on the front wheels in advance of the braking action on the rear wheels.

In the operation of the above described device, when the foot pedal is actuated, cable 8 will be actuated and all four brake bands of the rear brakes will be operated. Simultaneously with such action, the front cable 41 will be caused to actuate the front brakes, but, as before described, these latter brakes will, by reason of such preferred adjustment, be caused to operate slightly before the rear brakes are brought into operation.

In this manner, I obtain a braking action on all four wheels which may be caused to take effect simultaneously, or, according to the adjustment which may be adopted, the braking action on the front wheels may be caused to precede that on the rear wheels, or vice versa, according to the requirements demanded by the circumstances.

It will also be noted that by employing the front cable for operating the front wheel brakes, the dirigibility of the latter is in no wise affected, since during the turning of the wheels for steering purposes, the cable merely runs around the pulleys, as will be readily understood.

Figure 6 illustrates a modification of the construction above described, in which the rear plates 10 are eliminated, and the two rear cables connected separately each to a set of brakes, by having their respective ends connected directly with the crank arms 14 and 15, respectively, which operate the hollow outer rods 12 and inner rods 13 of such brakes. One of these cables is operated by the foot lever and the other by the emergency lever, as before. The front cable 41 passes around the pulley 39, as before, so that the operation of the foot lever will, in addition to operating one set of the rear brakes, also operate the front brakes.

Figure 7:
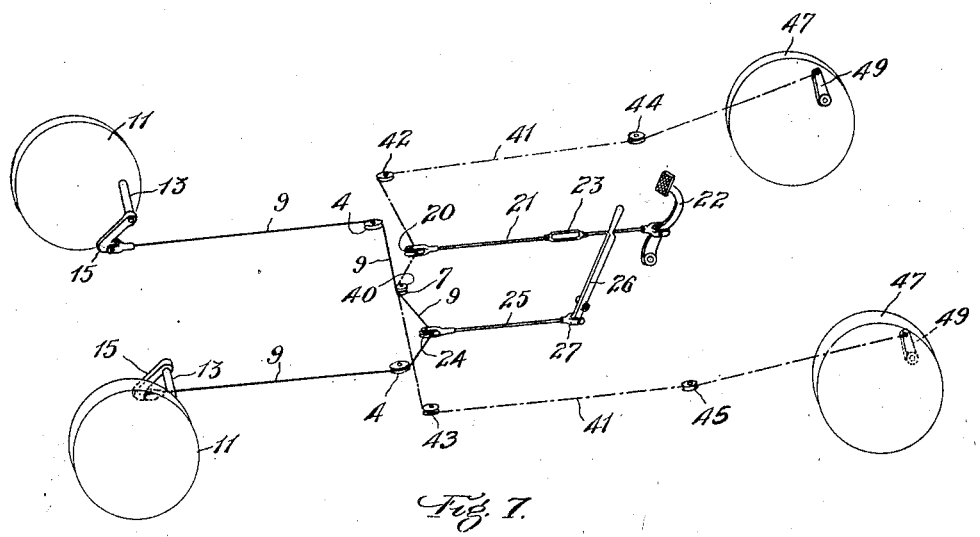

Figure 7 illustrates a second modification in which I employ only a single set of brake bands in the rear wheel brakes, that is, one band to each drum. Of course, in this construction the plates 10 are eliminated and only rear cable 9 employed. This cable is connected with the emergency lever only, that is, it engages the pulley 24 on the rod 25 which is connected with the emergency lever 26 running over, however, the pulleys 4 and 7 as before, pulleys 3 and 6 being in this case dispensed with.

The front cable 41 passes around the pulley 40 as before, and is engaged by the pulley 20 on the foot actuated rod 21, its front end being connected as before with the front wheel brakes. In this case the foot lever actuates the front brakes only, and the emergency lever the rear brakes only.

What I claim is:

1. In a braking system for automotive vehicles, the combination of rear wheels and brakes therefor; front dirigible wheels; brakes for the latter; an operating lever; a flexible cable connecting said lever with said front wheel brakes; and a flexible cable connecting said lever with said rear-wheel brakes.

2. In a braking system for automotive vehicles, the combination of a fixed front axle; dirigible wheels carried by the latter; brakes for said wheels; an operating lever; a flexible cable having its ends connected with said brakes and having a running connection with said operating lever; stationary guide pulleys mounted upon the vehicle frame around which said cable passes; rear wheels and brakes therefor; and a flexible cable connected with such last-named brakes and having a running connection with said lever.

3. In a braking system for automotive vehicles, the combination of rear wheels and brakes therefor; front dirigible wheels; brakes for the latter; a foot lever and an emergency lever; a flexible cable connecting one of said levers with the rear brakes and having a running connection with such lever; and a flexible cable connecting the front wheel brakes with one of said levers and having a running connection therewith.

4. In a braking system for automotive vehicles, the combination of rear wheels and brakes therefor; front dirigible wheels; brakes for the latter; a foot lever and an emergency lever; a flexible cable connected with the front wheel brakes and one of said levers; and a flexible cable connected with the rear wheel brakes and with the other lever.

5. In a braking system for automotive vehicles, the combination of rear wheels and a set of brakes therefor; front dirigible wheels and a set of brakes therefor; a foot lever and an emergency lever; flexible cables adapted to actuate the rear wheel brakes; and a flexible cable adapted to actuate the front wheel brakes; two cables being connected with one of said levers; and one cable being connected with the other of said levers.

6. In a braking system for automotive vehicles, the combination of rear wheels and two sets of brakes therefor; front dirigible wheels and a set of brakes therefor; a foot lever and an emergency lever; a pair of flexible cables each cable of which is connected with a set of rear wheel brakes; and a flexible cable connected with the front wheel brakes; one of said pair of cables and the third cable being connected with one of said levers, and the other of said pair of cables being connected with the other lever.

7. In a braking system for automotive vehicles, the combination of rear wheels and two sets of brakes therefor; front dirigible wheels and a set of brakes therefor; a foot lever and an emergency lever; a pair of flexible cables each cable of which is connected with both sets of rear wheel brakes; and a flexible cable connected with the front wheel brakes; one of said pair of cables and the third cable being connected with one of said levers; and the other of said pair of cables being connected with the other of said levers.

Signed by me, this 2nd day of August, 1920.

MELVIN STRINGER.